United States Patent
Beiermann et al.

(10) Patent No.: US 11,773,254 B2
(45) Date of Patent: Oct. 3, 2023

(54) CURED EPOXY RESIN COMPOSITION SUITABLE FOR ELECTRONIC DEVICE ENCLOSURE, ARTICLES, AND METHODS

(71) Applicant: 3M INNOVATIVE PROPERTIES COMPANY, St. Paul, MN (US)

(72) Inventors: Brett A. Beiermann, St. Paul, MN (US); John C. Clark, Maplewood, MN (US); Eric G. Larson, Lake Elmo, MN (US); Jeremy M. Higgins, Roseville, MN (US); Audrey S. Forticaux, Minneapolis, MN (US); Jay R. Lomeda, St. Paul, MN (US); Wayne S. Mahoney, St. Paul, MN (US); Scott B. Charles, Spring Valley, WI (US); Timothy D. Fletcher, Lino Lakes, MN (US); Wendy L. Thompson, Roseville, MN (US); Kyle R. Schwartz, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 758 days.

(21) Appl. No.: 16/756,518

(22) PCT Filed: Dec. 21, 2018

(86) PCT No.: PCT/US2018/067091
§ 371 (c)(1),
(2) Date: Apr. 16, 2020

(87) PCT Pub. No.: WO2019/133482
PCT Pub. Date: Jul. 4, 2019

(65) Prior Publication Data
US 2020/0283619 A1    Sep. 10, 2020

Related U.S. Application Data

(60) Provisional application No. 62/610,639, filed on Dec. 27, 2017.

(51) Int. Cl.
| | | |
|---|---|---|
| C08L 63/00 | (2006.01) | |
| C08K 3/14 | (2006.01) | |
| C08K 3/22 | (2006.01) | |
| C08K 3/38 | (2006.01) | |
| C08K 7/20 | (2006.01) | |
| H05K 5/02 | (2006.01) | |

(52) U.S. Cl.
CPC .............. *C08L 63/00* (2013.01); *C08K 3/14* (2013.01); *C08K 3/22* (2013.01); *C08K 3/38* (2013.01); *C08K 7/20* (2013.01); *H05K 5/02* (2013.01); *C08K 2003/2227* (2013.01); *C08K 2003/385* (2013.01); *C08K 2201/001* (2013.01); *C08K 2201/009* (2013.01)

(58) Field of Classification Search
None
See application file for complete search history.

(56) References Cited

U.S. PATENT DOCUMENTS

| | | |
|---|---|---|
| 3,658,750 A | 4/1972 | Tsukui |
| 6,194,024 B1 | 2/2001 | Arldt |
| 6,265,471 B1 | 7/2001 | Dietz |
| 7,072,145 B2 | 7/2006 | Deng |
| 7,550,097 B2 | 6/2009 | Tonapi |
| 7,906,373 B1 | 3/2011 | Czubarow |
| 7,968,624 B2 | 6/2011 | Fornes |
| 2002/0105093 A1 | 8/2002 | Papathomas |
| 2013/0338265 A1 | 12/2013 | Masatomi et al. |
| 2014/0213751 A1 | 7/2014 | Fukuzaki et al. |
| 2015/0299457 A1 | 10/2015 | Fu |

FOREIGN PATENT DOCUMENTS

| | | |
|---|---|---|
| CA | 2061093 | 8/1992 |
| CN | 103160076 | 5/2004 |
| CN | 102939313 | 3/2013 |
| CN | 104201251 | 12/2014 |
| DE | 19751109 | 5/1999 |
| JP | 2009242572 | * 10/2009 |
| JP | 2011-035313 | 2/2011 |
| JP | 2014-148579 A | 8/2014 |
| JP | 2014224167 | * 12/2014 |
| JP | 2014224167 A | * 12/2014 |
| WO | WO 2002-044273 | 11/2001 |

(Continued)

OTHER PUBLICATIONS

Kondo et al., JP 2014224167 A, Dec. 4, 2014 (machine translation) (Year: 2014).*
Kondo et al., JP 2014224167, Dec. 2014 (Year: 2014).*
Kaji et al., JP 2009242572, Oct. 2009 (Year: 2009).*
Admatechs "Thermal Conductive Fillers", 18 pages.
BYK-W 9012 Technical Data Sheet, 2 pages.
Capa 2054 Product Data Sheet, 1page.
Perstorp, Capa 2054 Safety Data Sheet, 2017, 10pages.
Chen "Thermal conductivity of polymer-based composites: Fundamentals and Applications", Progress in Polymer Science, 2016, vol. 59, pp. 41-85.

(Continued)

*Primary Examiner* — Cheng Yuan Huang
(74) *Attorney, Agent, or Firm* — Carolyn A. Fischer

(57) ABSTRACT

An electronic device is described comprising an enclosure, wherein the enclosure comprises a cured epoxy resin composition comprising at least 50 volume % of electrically non-conductive thermally conductive inorganic particles, wherein the inorganic particles are selected from alumina, boron nitride, silicon carbide, alumina trihydrate and mixtures thereof. The enclosure may be a housing of a phone, laptop, or mouse. Alternatively, the enclosure may be a case for an electronic device. Also described are epoxy resin compositions and a method of making an enclosure for an electronic device.

33 Claims, 5 Drawing Sheets

(56) References Cited

FOREIGN PATENT DOCUMENTS

| WO | 2012/091000 A1 | 7/2012 |
|---|---|---|
| WO | WO 2019-046407 | 3/2019 |

OTHER PUBLICATIONS

Songhan, "DOW-TONE-301 Polyol", 1page.
Epiclon," EXA-4850", 39pages.
Hexion, "EPON Resin 826 Technical Data Sheet", 2005, 3pages.
Huber, "Hydral Coat 7 Alumina Trihydrate Technical Data Sheet", 2010, 1page.
King Industries, "K-Pure Blocked Acids", 4pages.
King Industries, "K-Pure CXC-1612 Safety Data Sheet", 2015, 7pages.
Lindoxy 190 Safety Data Sheet, 2015, 8pages.
Lindau Chemicals, "Lindoxy 190 Resin Technical Data Sheet", 3pages.
Meyer, "Thermal Characteristics of Silicone Rubber Filled with ATH and Silica under Laser Heating", 2002, Annual Report Conference on Electrical Insulation and Dielectric Phenonmena, pp. 848-852.
Polymer Properties Database, 2015, 8pages.
Synasia, "Product Literature", 19pages.
Wong, "Thermal Conductivity, Elastic Modulus, and Coefficient of Thermal Expansion of Polymer Composites Filled With Ceramic Particles for Electronic Packaging", Journal of Applied Polymer Science, 1999, vol. 74, pp. 3396-3403.
Wong, "Comparative Study of Thermally Conductive Fillers for Use in Liquid Encapsulants for Electronic Packaging", IEEE Transactions on Advanced Packaging, 1999, vol. 22, No. 1, pp. 54-59.
Chung, Thermal Conductivity of Epoxy Resin Composites Filled with Combustion Synthesized h-BN Particles. Molecules, 2016, vol. 21, No. 5, pp. 670.1-11.
Anithambigai, "Potential Thermally Conductive Alumina Filled Epoxy Composite for Thermal Management of High Power LEDs", J Mater Sci: Mater Electron, 2017, No. 28, pp. 856-867.
Choi, "Thermal conductivity of epoxy composites with a binary-particle system of aluminum oxide and aluminum nitride fillers" Composites: Part B, 2013, vol. 51, pp. 140-147.
Sato, "Hydroxyl groups on silica, alumina, and silica-alumina catalysts", Journal of Catalysis, 1967, vol. 7, No. 4, pp. 342-351.
International Search report for PCT International Application No. PCT/US2018/067091 dated Apr. 17, 2019, 6 pages.

* cited by examiner

CURED EPOXY RESIN COMPOSITION SUITABLE FOR ELECTRONIC DEVICE ENCLOSURE, ARTICLES, AND METHODS

CROSS REFERENCE TO RELATED APPLICATIONS

This application is a national stage filing under 35 U.S.C. 371 of PCT/US2018/067091, filed Dec. 21, 2018, which claims the benefit of U.S. Application No. 62/610,639, filed Dec. 27, 2017, the disclosure of which is incorporated by reference in its/their entirety herein.

SUMMARY

In one embodiment, an electronic device is described comprising an enclosure, wherein the enclosure comprises a cured epoxy resin composition comprising at least 50 volume % of electrically non-conductive thermally conductive inorganic particles. The enclosure may be a housing of a phone, laptop, or mouse. Alternatively, the enclosure may be a case for an electronic device.

In another embodiment, an epoxy resin composition is described comprising an organic component comprising a first part comprising an epoxy resin and a second part comprising 2 to 20 wt. % of epoxy reactive oligomeric or polymeric moieties having a glass transition temperature less than 0° C.; and at least 50 volume % of electrically non-conductive thermally conductive inorganic particles.

In another embodiment, an epoxy resin composition is described comprising an organic component comprising a first part comprising an epoxy resin a second part comprising epoxy reactive oligomeric or polymeric moieties having a glass transition temperature less than 0° C.; and at least 50 volume % of electrically non-conductive thermally conductive inorganic particles; wherein the epoxy resin material has glass transition temperature less than 100° C. after curing.

In another embodiment, a method of making an enclosure for an electronic device is described comprising providing an epoxy resin composition, as described herein and forming the composition into a housing or case. In one embodiment, the step of forming comprises providing the epoxy resin composition in a mold and curing the epoxy resin composition.

DETAILED DESCRIPTION

Presently described are enclosures (e.g. housing or case) for electronic devices comprising a cured epoxy resin composition. Also described are curable epoxy resin compositions.

Figure 1:
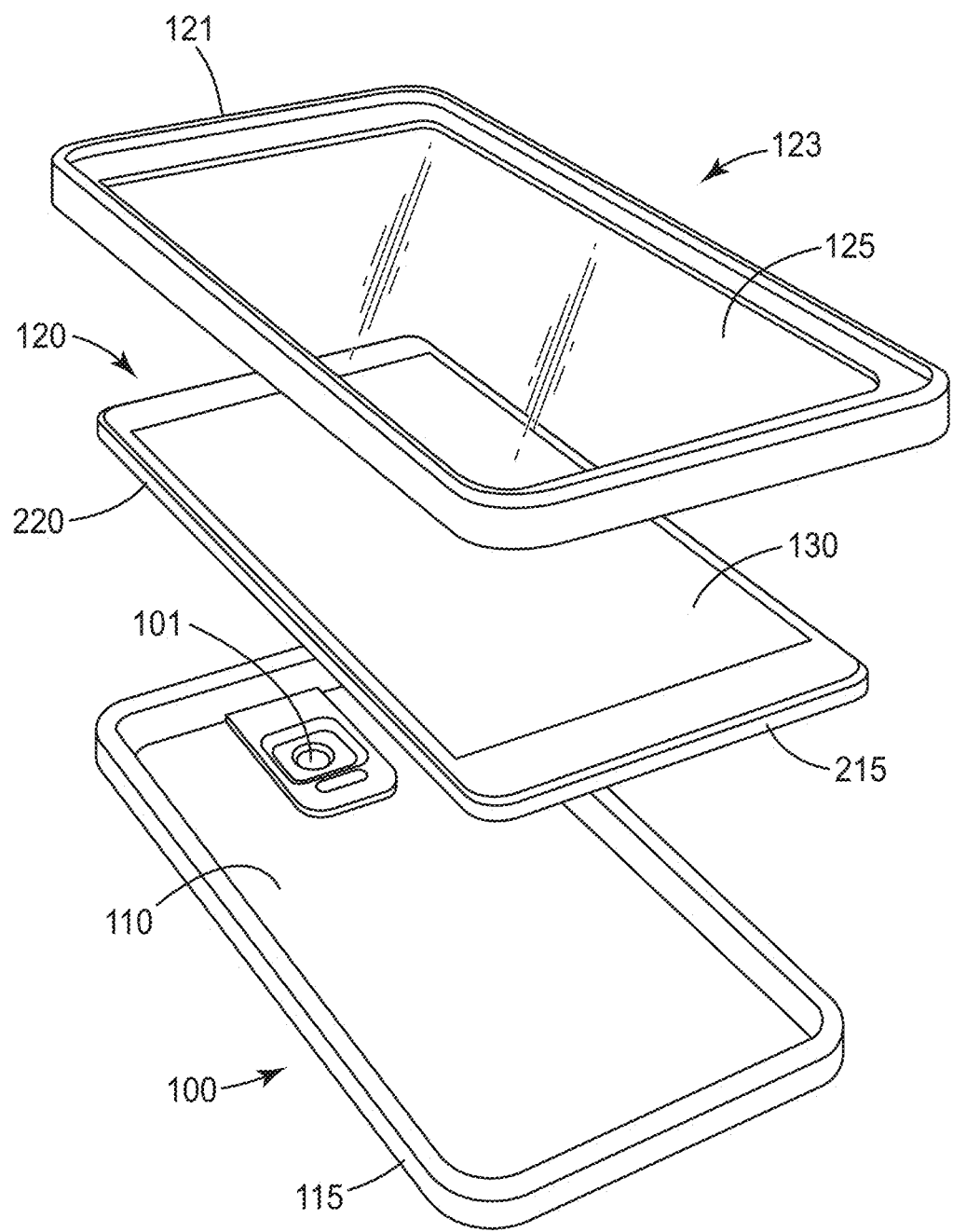
FIG. 1 is a schematic perspective view of a case for an electronic device.

With reference to FIG. 1, an embodied illustrative case 100, the case 100 is three-dimensional, generally comprising an inside major surface 110 that is parallel to the exterior major surface (not shown) and side walls 115. The case is shaped and sized to receive and fit electronic device 120. The case 100 typically includes an opening 101. The camera lens and flash of electronic device 120 is typically exposed through opening 101. Alternatively, opening 101 may further comprise a sufficiently transparent film such that the case 100 and cover 123 form a waterproof enclosure for the electronic device 120. The case 100 may optionally include a cover 123 that includes a sufficiently transparent film 125 in order that the display 130 of electronic device 120 can be viewed through the film 125. In some embodiments, the entire case 100 comprises the cured epoxy resin composition described herein. The frame 121 of cover 123 may also comprise the cured epoxy resin composition described herein. In some embodiments, only a portion of the case comprises the cured epoxy resin composition described herein. In some embodiments, the case or portion thereof is in electrical communication with a battery such that the battery can be charged through the case.

Figure 2:
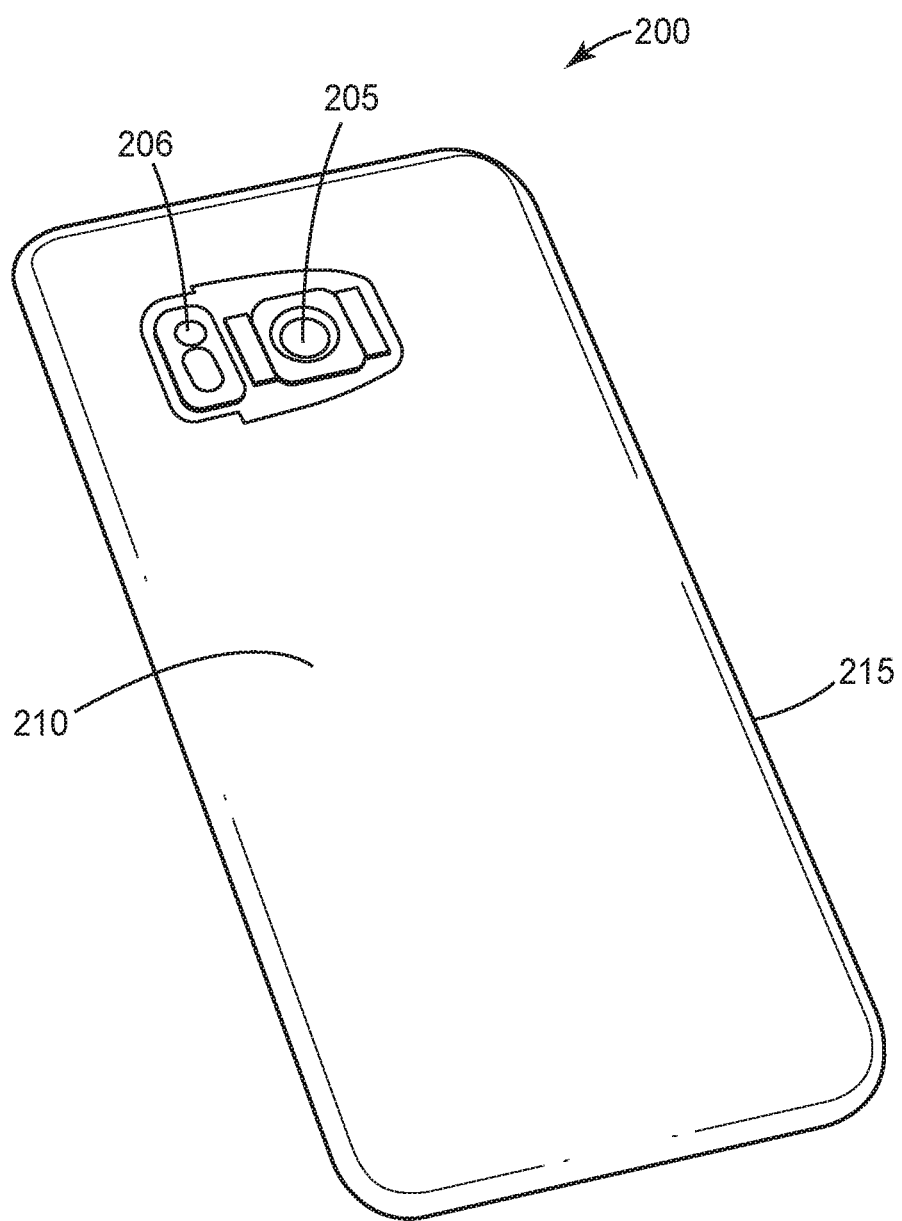
FIG. 2 is a perspective view of a housing of an electronic device.

With reference to FIGS. 1 and 2, embodied illustrative housings 200 and 220, the housings 200 and 220 are three-dimensional, generally comprising an inside major surface 210 that is parallel to the exterior major surface (not shown) and side walls 215. The housing 200 and 220 typically form the back of the electronic device. The housing 220 is attached to the front (e.g. display surface) 130 of electronic device 120. The electronic components (not shown) (e.g. battery, circuitry, computer chip, etc.) are disposed between front (e.g. display surface) 130 of the electronic device 120 and the housing 220. The housings 200 and 220 typically include a camera lens 205 and flash 206 integrated within the housing. In some embodiments, the entire housing 200 comprises the cured epoxy resin composition described herein. In other embodiments, only a portion of the housing comprises the cured epoxy resin composition described herein. In some embodiments, the housing or portion thereof is in electrical communication with a battery such that the battery can be charged through the case.

The epoxy resin composition described herein is suitable for use as an enclosure (e.g. case and/or housing) for various electronic devices. Illustrative electronic devices include, cell phones, table computers, laptop computers, and battery-operated accessories, such as a remote mouse.

The epoxy resin composition generally comprises at least one epoxy resins containing at least two epoxide groups. An epoxide group is a cyclic ether with three ring atoms, also sometimes referred to as a glycidyl or oxirane group. Epoxy resins are typically low molecular weight monomers that are liquids at ambient temperature.

The epoxy resin composition generally comprises at least one epoxy resin that comprises at least one cyclic moiety. The cyclic moiety may be aromatic or cycloaliphatic.

In some embodiments, the epoxy resin composition comprises a bisphenol epoxy resin. Bisphenol epoxy resins are formed from reacting epichlorohydrin with bisphenol A to form diglycidyl ethers of bisphenol A.

Examples of commercially available bisphenol epoxy resins include diglycidyl ethers of bisphenol A (e.g. those available under the trade designations EPON 828, EPON 1001, EPON 1004, EPON 2004, EPON 1510, and EPON 1310 from Momentive Specialty Chemicals, Inc., and those under the trade designations D.E.R. 331, D.E.R. 332, D.E.R. 334, and D.E.N. 439 available from Dow Chemical Co.); diglycidyl ethers of bisphenol F (e.g., that are available under the trade designation ARALDITE GY 281 available from Huntsman Corporation) or blends of bisphenol A and F resins such as EPIKOTE 232 from Momentive Specialty Chemicals, Inc.; flame retardant epoxy resins (e.g., that are available under the trade designation DER 560, and brominated bisphenol type epoxy resin, such as available from Dow Chemical Company.

Aromatic epoxy resins can also be prepared by reaction of aromatic alcohols such as biphenyl diols and triphenyl diols and triols with epichlorohydrin. Such aromatic biphenyl and triphenyl epoxy resins are not bisphenol epoxy resins. One representative compound is tris-(hydroxyl phenyl)methane-based epoxy available from Huntsman Corporation, Basel, Switzerland as Tactix™ 742.

Novolac epoxy resins are formed by reaction of phenols with formaldehyde and subsequent glycidylation with epichlorohydrin produces epoxidized novolacs, such as epoxy phenol novolacs (EPN) and epoxy cresol novolacs (ECN). These are highly viscous to solid resins with typical mean epoxide functionality of around 2 to 6. A representative commercially available novolac epoxy resin is a semi-solid epoxy novolac resin commercially available from Dow as the trade designation "D.E.N. 431." Such novolac epoxy resins can be used in combination with an epoxy resin that is liquid at 25° C.

Preferred epoxy resins are cycloaliphatic epoxy resins containing more than one 1,2 epoxy group per molecule. These are generally prepared by epoxidizing unsaturated aromatic hydrocarbon compounds, such as cyclo-olefins, using hydrogen peroxide or peracids such as peracetic acid and perbenzoic acid, as known in the art.

Such cycloaliphatic epoxy resins have a saturated (i.e. non-aromatic) ring structure wherein the epoxide group is part of the ring or is attached to the ring structure. These epoxy resins typically contain one or more ester linkages between the epoxide groups. Alkylene ($C_1$-$C_4$) linkages are also typically present between an epoxide group and ester linkage or between ester linkages.

One preferred cycloaliphatic epoxy resin is 3,4-epoxycyclohexylmethyl-3,4-epoxycyclohexane carboxylate, depicted as follows:

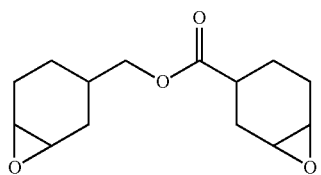 [SMILES: O=C(OCC1CCC2OC2C1)C1CCC2OC2C1]

Another preferred illustrative cycloaliphatic epoxy resin is bis(3,4-epoxycyclohexylmethyl) adipate, depicted as follows:

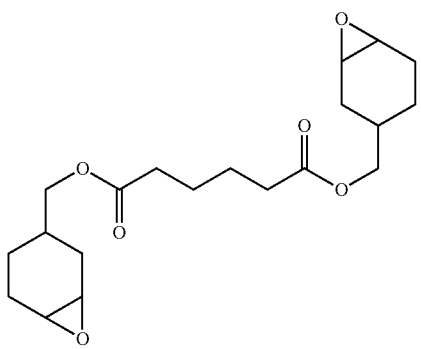 [SMILES: O=C(CCCCC(=O)OCC1CCC2OC2C1)OCC1CCC2OC2C1]

Another suitable cycloaliphatic epoxy resins includes vinylcyclohexane dioxide that contains two epoxide groups, one that is part of a ring structure; 3,4-epoxy-6-methylcyclohexylmethyl-3,4-epoxycyclohexane carboxylate and dicyclopentadiene dioxide.

Other suitable cycloaliphatic epoxy resins including glycidyl ethers include 1,2-bis(2,3-epoxycyclopentyloxy)-ethane; 2,3-epoxycyclopentyl glycidyl ether; diglycidyl cyclohexane-1,2-dicarboxylate; 3,4-epoxycyclohexyl glycidyl ether; bis-(2,3-epoxycyclopentyl) ether; bis-(3,4-epoxycyclohexyl) ether; 5(6)-glycidyl-2-(1,2-epoxyethyl)bicyclo [2.2.1]heptane; cyclohexa-1,3-diene dioxide; 3,4-epoxy-6-methylcyclohexylmethyl3',4'-epoxy-6'-methylcyclohexanecarboxylate.

Also suitable are epoxy resins in which the 1,2-epoxy groups are attached to various heteroatoms or functional groups; such compounds include, for example, the N,N,O-triglycidyl derivative of 4-aminophenol, the N,N,O-triglycidyl derivative of 3-aminophenol, the glycidyl ether/glycidyl ester of salicylic acid, N-glycicyl-N'-(2-glycidyloxypropyl)-5,5-dimethylhydantoin or 2-glycidyloxy-1,3-bis-(5,5-dimethyl-1-glycidylhydantoin-3-yl)propane.

The epoxy resin typically has an epoxy equivalent weight from 50 to 250, 300, 350, 400, 450, or 500 grams per epoxide group. The epoxy resins typically have a viscosity less than about 1000 cps at 25° C. In some embodiments, the viscosity is at least 50, 100, 150, 200, 250, or 300 centipoise. In some embodiments, the viscosity is no greater than 900, 800, 700, 600, or 500 centipoise. A single epoxy resin or combination of epoxy resins may be utilized. The epoxy resin composition typically comprises at least 5, 6, 7, 8, 9, or 10 wt.-% of epoxy resin(s), based on the weight of the total epoxy resin composition. Due to the high concentration of thermally conductive inorganic particles, the amount of epoxy resin(s), is typically no greater than 20 wt.-%, and in some embodiments no greater than 19, 18, 17, 16, or 15 wt.-%.

In some embodiments, the epoxy resin composition further comprises an oligomeric or polymeric component. The oligomeric or polymeric component can impart flexibility, thermal shock resistance, crack resistance and impact resistance to the cured epoxy resin composition. Unless specified otherwise, glass transition temperature (Tg) refers to the glass transition temperature as determined according to the test method described in the examples. The oligomeric or polymeric component generally has a glass transition temperature (Tg) of less than 0° C. In some embodiments, the glass transition temperature of the oligomeric component is less than −20° C., −30° C., −40° C., −50° C., −60° C. The glass transition temperature of the oligomeric component is typically at least −80° C. or −70° C. The glass transition temperature of various homopolymers is reported in the literature. The glass transition temperature of various copolymers is also reported in the literature or can be approximated using the Fox equation.

In some embodiments, the oligomeric or polymeric component is a toughening agent, an epoxy-reactive oligomeric or polymeric component, or a combination thereof. The epoxy resin composition may include at least one toughening agent and at least one epoxy-reactive oligomeric or polymeric component, two or more toughening agents, or two or more epoxy-reactive oligomeric and/or polymeric components.

The glass transition temperature of the epoxy resin in the absence of the oligomeric or polymeric component is greater than 100° C. In some embodiments, the glass transition temperature of the epoxy resin in the absence of the oligomeric or polymeric component is at least 110° C., 120° C., 130° C., 140° C., or 150° C. The glass transition temperature of the epoxy resin in the absence of the oligomeric or polymeric component is typically no greater than 300° C., 275° C., 250° C., 225° C., 200° C., or 175° C.

When the oligomeric or polymeric component is a toughening agent, the glass transition of the epoxy resin composition containing the toughening agent may fall within the same as the epoxy resin alone. In some embodiments, the inclusion of the toughening agent may reduce the Tg of the epoxy resin composition by 10, 20, 30, 40 or 50° C. or greater relative to the epoxy resin alone. In some embodiments, such as when an epoxy-reactive oligomeric and/or polymeric component is utilized the cured epoxy resin composition has a Tg less than 140, 135, or 130° C. In some embodiments, the cured epoxy resin composition has a Tg less than 125, 120, 115, 110, 105, or 100° C. In some embodiments, the cured epoxy resin composition has a Tg less than 100° C. In some embodiments, the cured epoxy resin composition has a Tg of at least 50, 55, 60, 65, 70, 75, 80, 85, 90, or 100° C.

Figure 3:
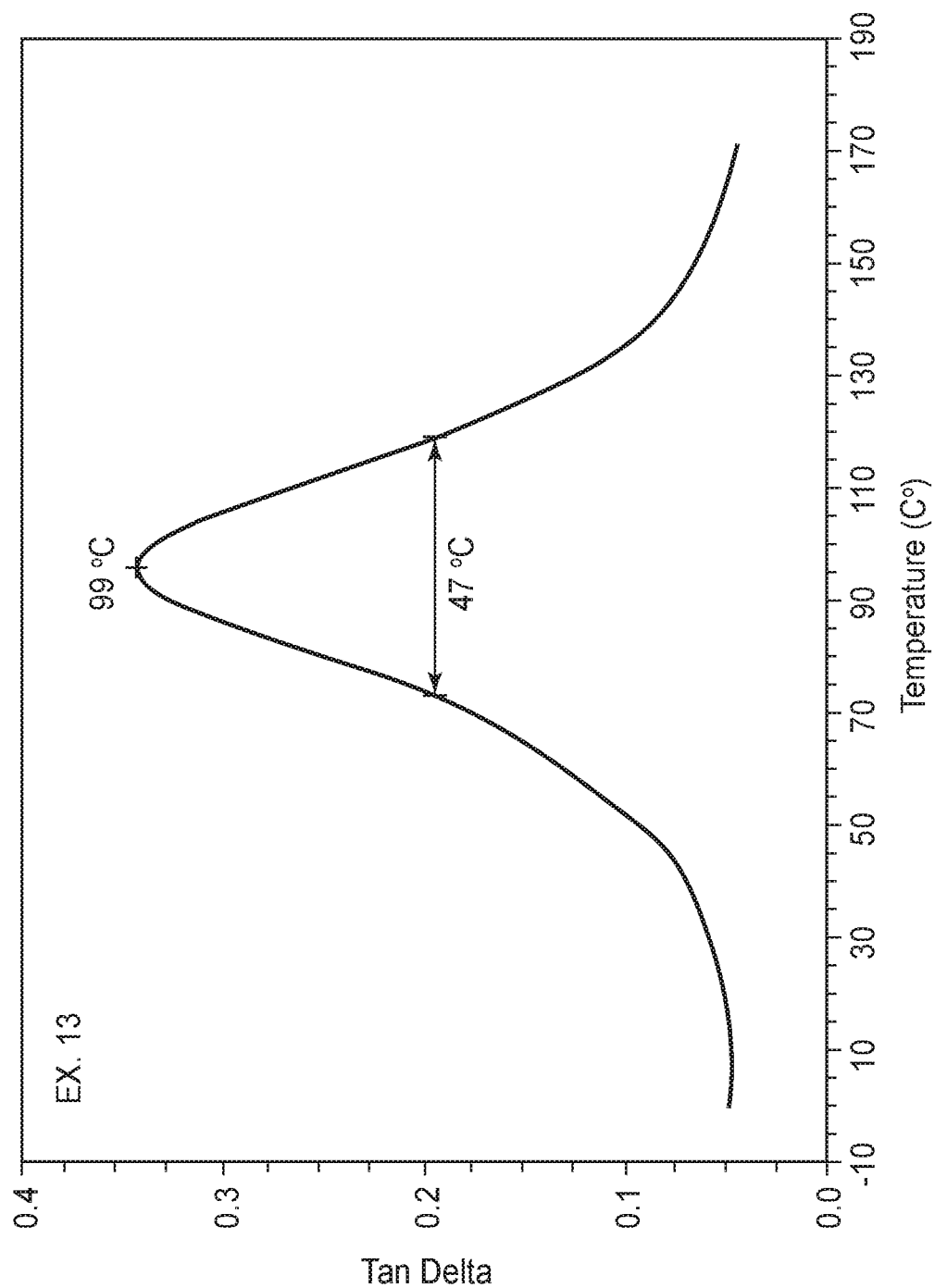
FIG. 3-5 are plots of tan delta as a function of temperature of various embodied cured epoxy resin compositions.

In some embodiments, the cured epoxy resin composition has a single glass transition temperature, such as depicted in FIG. 3. For example, in one embodiment when the epoxy resin composition comprises oligomeric or polymeric moieties (e.g. polycaprolactone) and the dispersant comprises (e.g. polycaprolactone) moieties that are miscible with the oligomeric or polymeric moieties, the cured epoxy resin can comprise a single Tg. When the cured epoxy resin composition comprises a single Tg, the tan delta peak is typically relatively narrow. For example, the tan delta peak width at half height is 50° C. or less.

Figure 4:
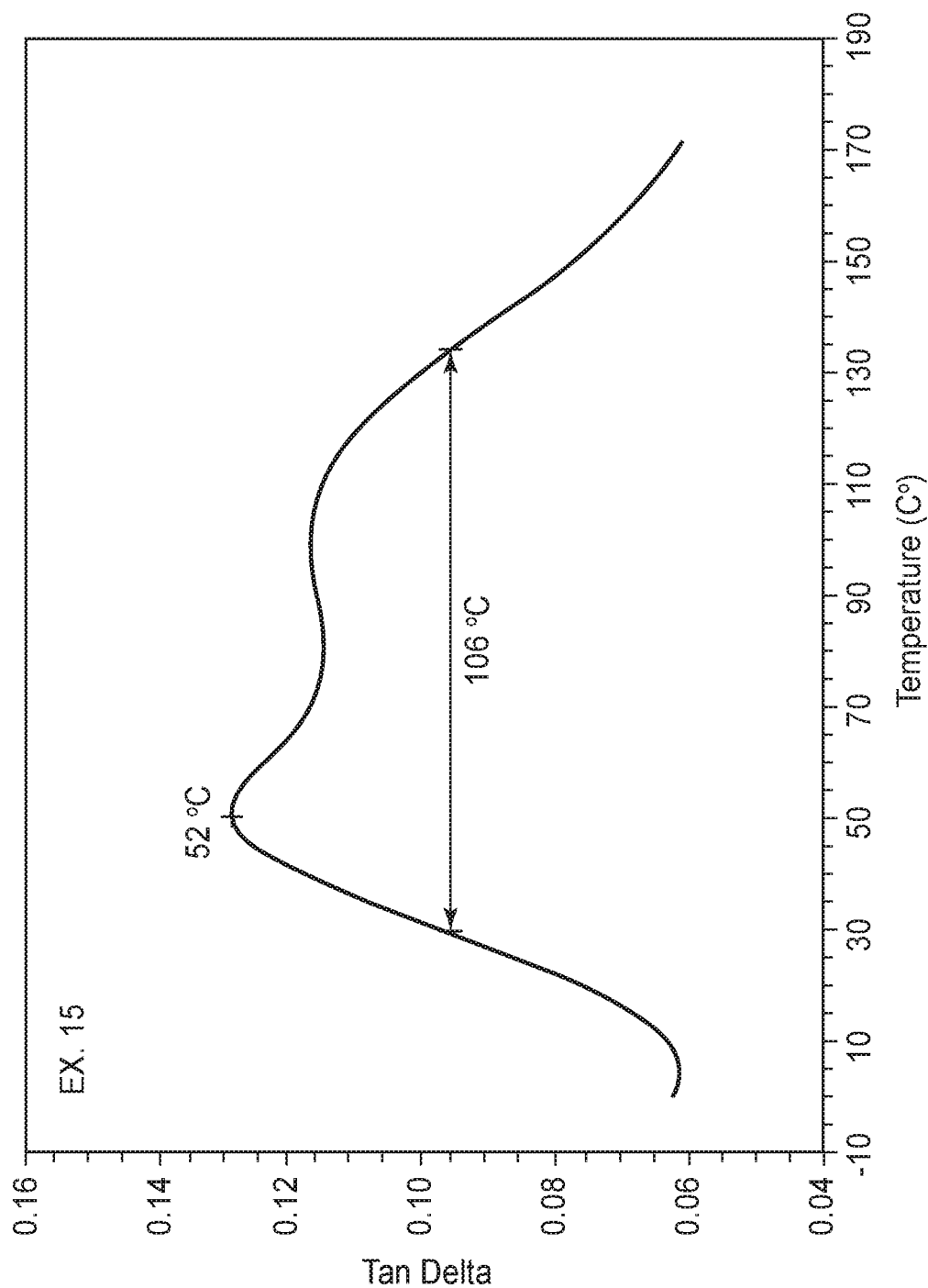

In other embodiments, the cured epoxy resin composition has at least two glass transition temperatures, such as depicted in FIG. 4.

Figure 5:
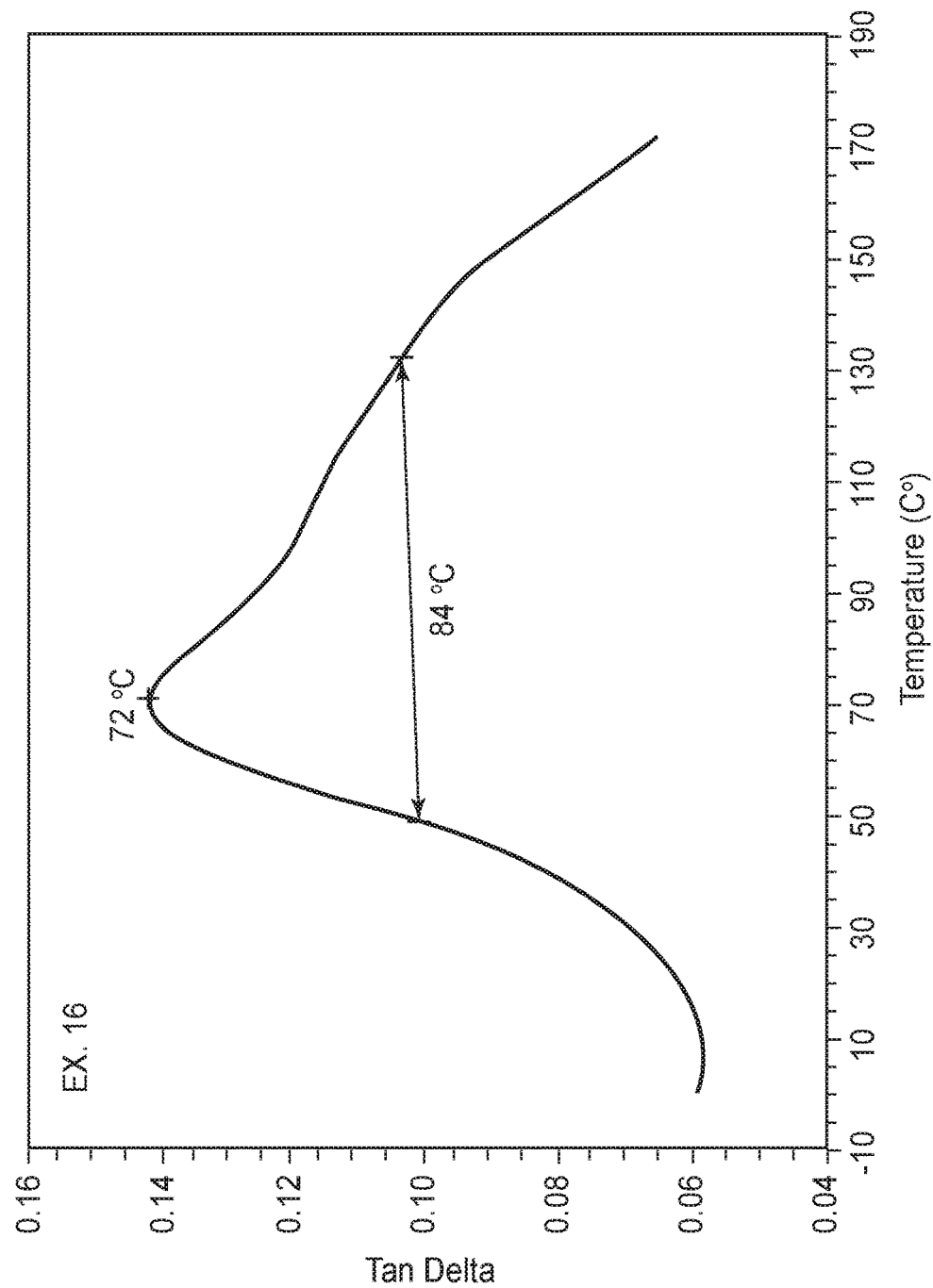

In another embodiment, the cured epoxy resin composition can exhibit a single or multiple Tgs in combination with a relatively broad tan delta peak, such as depicted in FIG. 5. In this, embodiment, the tan delta peak width at half height is greater than 50° C. For example, in some embodiments the tan delta peak width at half height is at least 55, 60, 65, 70, 75, 80, 85 or 90° C. The tan delta peak width at half height is typically no greater than 125, 120, 115, or 110° C.

The epoxy resin composition typically comprises at least 1, 1.5, 2, or 2.5 wt.-% of oligomeric and/or polymeric component(s), based on the weight of the total epoxy resin composition. The amount of oligomeric and/or polymeric components(s), is typically no greater than 20, 19, 18, 17, 16, or 15 wt.-%. In some embodiments, the amount of oligomeric and/or polymeric components(s), is no greater than 14, 13, 12, 11, or 10 wt.-%.

The weight ratio of epoxy resin to oligomeric and/or polymeric component(s) can vary. Typically, the amount of epoxy resin by weight is equal to or greater than the amount of oligomeric and/or polymeric component(s). The weight ratio of epoxy resin to oligomeric and/or polymeric component(s) can range from 1:1 to 10:1. In some embodiments, the weight ratio of epoxy resin to oligomeric and/polymeric component(s) is at least 1.1:1; 1.2:1; 1.3:1; 1.4:1; or 1.5:1. In some embodiments, the weight ratio of epoxy resin to oligomeric and/or polymeric component(s) is no greater than 7:1 or 6:1 or 5:1 or 4:1 or 3:1.

In some embodiments, the oligomeric or polymeric component may be characterized as a toughening agent. A toughening agent is typically an organic polymer additive that phase separates in a cured epoxy resin. Toughening agents can be characterized as being non-reactive oligomeric or polymeric components. Toughening agents include for example block copolymers, amphiphilic block copolymers, acrylic block copolymers, carboxyl terminated butadiene acrylonitrile rubber (CTBN), core shell rubbers (CSR), linear polybutadiene-polyacrylonitrile copolymers, oligomeric polysiloxanes, silicone polyethers, organopolysiloxane resins, or mixtures thereof. Other epoxy-reactive polymeric toughening agents include carboxyl terminated polybutadiene, polysulfide-based toughening agents, amine terminated butadiene nitrile rubbers, polythioethers, or mixtures thereof.

The amphiphilic polyether block copolymer toughening agents include one or more polyether block copolymers comprising at least one epoxy miscible polyether block segment derived from an alkylene oxide such as ethylene oxide (EO) and at least one epoxy immiscible polyether block segment derived from an alkylene oxide such as for example 1,2-epoxy butane known commonly as butylene oxide (BO). The immiscible block segment may also be comprised of mixtures of $C_3$ or higher carbon analogue monomers that are copolymerized together to provide the immiscible block segment.

Examples of the epoxy resin miscible polyether block segment include a polyethylene oxide block, a propylene oxide block, a poly(ethylene oxide-co-propylene oxide) block, a poly(ethylene oxide-ran-propylene oxide) block, or mixtures thereof. Preferably, the epoxy resin miscible polyether block segment useful in the present invention can be a polyethylene oxide block.

Examples of the epoxy resin immiscible polyether block segment include a polybutylene oxide block, a polyhexylene oxide block derived from 1,2-epoxy hexane, a polydodecylene oxide block derived from 1,2-epoxy dodecane, or mixtures thereof. Preferably, the epoxy resin immiscible polyether block segment useful in the present invention can be a polybutylene oxide block.

Amphiphilic polyether block copolymer toughening agents include for example, but are not limited to, a diblock copolymer, a linear triblock, a linear tetrablock, other multiblock structures, a branched block structure, or star block structure.

Examples of amphiphilic polyether diblock copolymer toughening agent include poly(ethylene oxide)-b-poly(butylene oxide)(PEO-PBO) or amphiphilic polyether triblock copolymers such as, for example, poly(ethylene oxide)-b-poly(butylene oxide)-b-poly(ethylene oxide) (PEO-PBO-PEO).

In another embodiment, the epoxy resin composition comprises an epoxy-reactive oligomeric component comprises a relatively small number of repeat units as compared to typical polymers. The weight average molecular weight of the epoxy-reactive oligomeric component is typically at least 150, 200, 150, 300, 350, 400, 450 or 500 g/mole. In some embodiments, the weight average molecular weight of the oligomeric component is no greater than 10,000; 9,000; 8,000; 7,000; or 6,000 g/mole and in some embodiments no greater than 5,000, 4,500; 4,000, 3,500; 3,000; 2,500; 2,000; 1,500, or 1,000 g/mole. The oligomeric toughening agents can also have a molecular weight in this range. In other embodiments, the polymeric toughening agents can have a higher molecular weight, ranging up to 1,000,000 g/mole or 2,000,000 g/mole or greater. For example, when the polymeric toughening agent is a crosslinked thermoset, the molecular weight may be too high to measure using conventional techniques. In some embodiments, the polymeric toughening agents have a weight average molecular weight of no greater than 500,000; 400,000; 300,000; or 200,000 g/mole.

In some embodiments, the epoxy-reactive oligomeric component has a melting point no greater than 30° C. or 25° C. The melting point is typically at least about 0° C., 5° C., or 10° C.

In some embodiments, the epoxy-reactive oligomeric component is a linear or branched polyester diol derived from caprolactone. Polycaprolactone (PCL) homopolymer is a biodegradable polyester with a low melting point of about 60° C. and a glass transition temperature of about −60° C. PCL can be prepared by ring opening polymerization of epsilon-caprolactone using a catalyst such as stannous octanoate, as known in the art.

One suitable linear polyester diols derived from caprolactone is Capa™ 2054, reported to have a hydroxyl number of 200-215 mg KOH/g and a melting point of 18-23° C.

Another suitable tri-functional polyol is Dow TONE™ 301 Polyol, reported to have a hydroxyl number of 561 and a melting point from 0-24° C.

In some embodiments, the oligomeric component may be characterized as a semi-crystalline component.

By "crystalline" it is meant that the material displays a crystalline melting point at 20° C. or above when measured in the composition by differential scanning calorimetry (DSC). The peak temperature of the observed endotherm is taken as the crystalline melting point. The crystalline phase includes multiple lattices in which the material assumes a conformation in which there is a highly ordered registry in adjacent chemical moieties of which the material is constructed. The packing arrangement (short order orientation) within the lattice is highly regular in both its chemical and geometric aspects.

A semi-crystalline component typically comprises long segments of polymer chains that appear in both amorphous and crystalline states or phases at 20° C. or above. The amorphous phase is considered to be a randomly tangled mass of polymer chains. The X-ray diffraction pattern of an amorphous polymer is a diffuse halo indicative of no ordering of the polymer structure. Amorphous polymers show softening behavior at the glass transition temperature, but no true melt or first order transition. A material in a semicrystalline state shows characteristic melting points, above which the crystalline lattices become disordered and rapidly lose their identity. The X-ray diffraction pattern of such "semicrystalline" materials generally is distinguished by either concentric rings or a symmetrical array of spots, which are indicative of the nature of the crystalline order.

Examples of other epoxy-reactive oligomeric components include for example fatty acids; fatty acid anhydrides such as polyazelaic polyanhydride and dodecenylsuccinic anhydride; diols such as ethylene glycol, polyols, polyetherdiols such as polymers of ethylene glycol polyethylene glycol and polypropylene glycol, fatty alcohols, and other materials having hydroxyl groups, carboxyl epoxy, and/or carboxylic anhydride functionality. Other suitable oligomeric components include trihydric and dihydric carboxyl-terminated, carboxylic anhydride-terminated, glycidyl-terminated and hydroxyl-terminated polyethylene glycols, polypropylene glycols or polybutylene glycols.

In some embodiments, the epoxy resin composition comprises a bisphenol epoxy resin that comprises a flexibilized backbone. One representative structure is as follows:

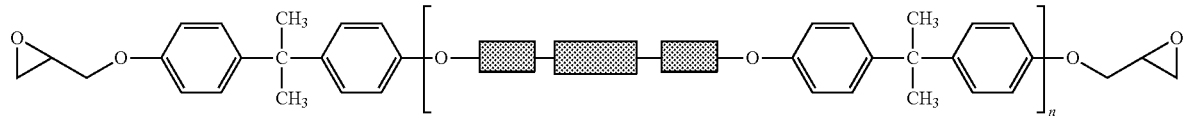

wherein the larger central block represents an oligomeric segment and the smaller blocks represent optional polar segments. One representative bisphenol epoxy resin that comprises a flexibilized backbone is commercially available from DEC Corporation, Japan under the trade designation "EPICLON EXA 4850-150". In this embodiment, the oligomeric component can be characterized as an epoxy reactive component that has been pre-reacted with the epoxy resin.

In some embodiments, the viscosity of the bisphenol epoxy resin comprising a flexibilized backbone is less than 50,000; 45,000, 40,000; 35,000; 30,000; or 25,000 cps at 25° C. The viscosity is typically at least 5,000 cps at 25° C. In some embodiments, the molecular weight of the bisphenol epoxy resin comprising a flexibilized backbone is at least 200, 250, or 350 g/mole. In other embodiments, the molecular weight of the bisphenol epoxy resin comprising a flexibilized backbone is at least 400, 500, 600, or 700 g/mole. In yet other embodiments, the molecular weight of the bisphenol epoxy resin comprising a flexibilized backbone is at least 750, 800, or 900 g/mole. The molecular weight is typically no greater than 2000 or 1500 g/mole.

Other suitable epoxy-reactive oligomeric components include modified hydroxy terminated silicones having the general formulas

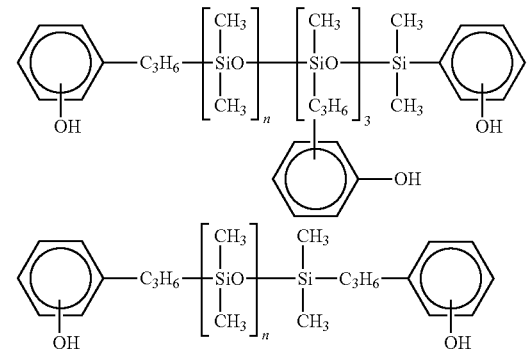

wherein n is an integer from 10 to 300.

Other suitable epoxy-reactive oligomeric components include carboxyl-terminated, hydroxyl-terminated, mercapto-terminated or glycidyl ether-terminated copolymers based on butadiene, and polar, ethylenically unsaturated comonomers. One suitable epoxidized butadiene prepolymer, having an average molecular weight of about 1200 to 1300, is commercially available as Poly Bd 605 from Elf Atochem North America Inc.

The epoxy resin composition optionally comprises a curing agent. Common classes of curatives for epoxy resins include amines, amides, ureas, imidazoles, and thiols. The curing agent is typically highly reactive with the epoxide groups at ambient temperature.

In some embodiments, the curing agent comprises reactive —NH groups or reactive —NR$_1$R$_2$ groups wherein R$_1$ and R$_2$ are independently H or C$_1$ to C$_4$ alkyl, and most typically H or methyl.

One class of curing agents are primary, secondary, and tertiary polyamines. The polyamine curing agent may be straight-chain, branched, or cyclic. In some favored embodiments, the polyamine crosslinker is aliphatic. Alternatively, aromatic polyamines can be utilized.

Useful polyamines are of the general formula R$_5$—(NR$_1$R$_2$)$_x$ wherein R$_1$ and R$_2$ are independently H or alkyl, R$_5$ is a polyvalent alkylene or arylene, and x is at least two. The alkyl groups of R$_1$ and R$_2$ are typically C$_1$ to C$_{18}$ alkyl, more typically C$_1$ to C$_4$ alkyl, and most typically methyl. R$_1$ and R$_2$ may be taken together to form a cyclic amine. In some embodiment x is two (i.e. diamine). In other embodiments, x is 3 (i.e. triamine). In yet other embodiments, x is 4.

Useful diamines may be represented by the general formula:

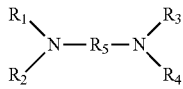

wherein R$_1$, R$_2$, R$_3$ and R$_4$ are independently H or alkyl, and R$_5$ is a divalent alkylene or arylene. In some embodiments, R$_1$, R$_2$, R$_3$ and R$_4$ are each H and the diamine is a primary amine. In other embodiments, R$_1$ and R$_4$ are each H and R$_2$, and R$_4$ are each independently alkyl; and the diamine is a secondary amine. In yet other embodiments, R$_1$, R$_2$, R$_3$ and R$_4$ are independently alkyl and the diamine is a tertiary amine.

In some embodiments, primary amines are preferred. Examples include hexamethylene diamine; 1,10-diaminodecane; 1,12-diaminododecane; 2-(4-aminophenyl)ethylamine; isophorone diamine; norbornane diamine 4,4'-diaminodicyclohexylmethane; and 1,3-bis(aminomethyl)cyclohexane. Illustrative six member ring diamines include for example piperzine and 1,4-diazabicyclo[2.2.2]octane ("DABCO").

Other useful polyamines include polyamines having at least three amino groups, wherein the three amino groups are primary, secondary, or a combination thereof. Examples include 3,3'-diaminobenzidine and hexamethylene triamine.

Common curing agents used to cure cycloaliphatic epoxy resin include anhydrides derived from a carboxylic acid which possesses at least one anhydride group. Such anhydride curing agents are described in U.S. Pat. No. 6,194,024; incorporated herein by reference.

In some embodiments, such as when a toughening agent, rather than an epoxy-reactive oligomeric component is utilized, a curing agent can be employed in amounts constituting on an equivalent basis, about 20% to about 120%, preferably about 80 to 110% of the epoxy resin and preferably about 75% to about 100% of the epoxide equivalents.

However, when an epoxy-reactive oligomeric component is utilized, the (e.g. hydroxyl functional) epoxy-reactive component can act as a curing agent. In this embodiment, the epoxy resin composition may contain curing agent in an amount of less than 20%, 15%, 10%, 5% of the epoxide equivalents.

In some embodiments, the epoxy resin composition further comprises a catalyst. Suitable catalysts for the epoxy resins include, for example, tertiary amines and acidic catalysts such as stannous octoate and antimony hexafluoride, and imidazoles. Other suitable catalysts are the fully substituted compounds including: quaternary ammonium hydroxides and halides; quaternary phosphonium halides; arsines, amine oxides; aminophenols; phosphine oxides; phosphines; phosphonium halides; amines; phosphoramides; phosphineamines; and tertiary aminophenols. Mixtures of catalyst are also suitable.

The concentration of the catalyst(s) is typically less than about 3, 2.5, 2, 1.5 or 1 wt.-%, based on the weight of the total epoxy resin composition. In some embodiments, the amount of catalyst is at least 0.005, 0.01, 0.025, 0.05, or 0.1 wt.-%.

The epoxy resin composition comprises thermally conductive inorganic particles. Generally, the type and loading levels of the inorganic particles are selected to provide the desired thermal conductivity. In some embodiments, the thermal conductivity of the cured epoxy resin composition (as determined by the test method described in the examples) is at least 0.90, 0.95, or 1.0 W/m*K. In some embodiments, the thermal conductivity of the cured epoxy resin composition is at least 1.10, 1.15, or 1.20 W/m*K. In some embodiments, the thermal conductivity of the cured epoxy resin composition is no greater than 3.0, 2.9, 2.8, 2.7, 2.6, 2.5, 2.4, 2.3, 2.3, 2.1 or 2.0 W/m*K.

In some embodiments, the cured epoxy resin composition is sufficiently conducting such that an electronic device comprising a battery can be charged through an enclosure (e.g. housing and/or case) comprising such cured epoxy resin composition. The inclusion of the thermally conductive inorganic particles also results in the cured epoxy resin composition being cool to the touch and resembling a ceramic rather than plastic material.

The epoxy resin composition comprises thermally conductive particles in an amount greater than 45 vol. % based on the total volume of the epoxy composition. In some embodiments, the amount of thermally conductive inorganic fillers is at least 46, 47, 48, 49, or 50 vol %. The amount of thermally conductive inorganic fillers is typically no greater than 75, 74, 73, 72, 71, 70, 69, 68, 67, 66, 65, 64, 63, 62, 61 or 60 vol. %, based on the total volume of the epoxy composition.

Due to the relative high concentration of thermally conductive particles, the cured epoxy resin composition can have a higher density. For example, as evident by forthcoming Comparative Examples 1 and 2, compositions lacking thermally conductive particles can have a density ranging from about 1.1 g/cc to about 1.3 g/cc. Comparative Example 3, containing 45 vol. % thermally conductive particles has a density of 2.29 g/cc. However, the exemplified compositions have a density greater than 2.29 g/cc. In some embodiments, the cured epoxy resin composition has a density of at least 2.30, 2.31, 2.32, 2.33, 2.34, 2.35, 2.36, 2.37, 2.38, 2.39, or 2.40 g/cc. In some embodiments, the cured epoxy resin composition has a density of at least 2.41, 2.42, 2.43, 2.44, 2.45, 2.46, 2.47, 2.48, 2.49, or 2.50 g/cc. In some embodiments, the cured epoxy resin composition has a density no greater than 2.65, 2.64, 2.63, 2.62, 2.61 or 2.60 g/cc.

The thermally conductive inorganic particles are preferably an electrically non-conductive material. Suitable electrically non-conductive, thermally conductive materials include ceramics such as metal oxides, hydroxides, oxyhydroxides, silicates, borides, carbides, and nitrides. Suitable ceramic fillers include, e.g., silicon oxide, aluminum oxide, aluminum trihydroxide (ATH), boron nitride, silicon carbide, and beryllium oxide. Such materials are not electrically conductive, i.e. have an electronic band gap greater than 0 eV and in some embodiments, at least 1, 2, 3, 4, or 5 eV. In some embodiments, such material have an electronic band gap no greater than 15 or 20 eV. The epoxy resin composition may optionally further comprise small concentration of thermally conductive particles having an electronic band gap of less than 0 eV or greater than 20 eV.

In favored embodiments, the thermally conductive particles comprise a material having a bulk thermal conductivity >10 W/m*K. The thermal conductivity of some representative inorganic materials is set forth in the following table.

| Thermal Conductivity | | |
|---|---|---|
| Material | Thermal Conductivity (W/m*K) | Electronic Band Gap (eV) |
| α-Aluminum Oxide[1] | 30 | 5-9 |
| Alumina Trihydrate[2] | 21 | |
| Silicon Carbide (SiC)[1] | 120 | 2.4 |
| Hexagonal Boron Nitride (BN)[1] | 185-300 | 2.1 |

In some embodiments, the thermally conductive particles comprise material(s) having a bulk thermal conductivity of at least 15 or 20 W/m*K. In other embodiments, the thermally conductive particles comprise material(s) having a bulk thermal conductivity of at least 25 or 30 W/m*K. In yet other embodiments, the thermally conductive particles comprise material(s) having a bulk thermal conductivity of at least 50, 75 or 100 W/m*K. In yet other embodiments, the thermally conductive particles comprise material(s) having a bulk thermal conductivity of at least 150 W/m*K. In typical embodiments, the thermally conductive particles comprise material(s) having a bulk thermal conductivity of no greater than about 350 or 300 W/m*K.

Thermally conductive particles are available in numerous shapes, e.g. spheres, irregular, platelike, and acicular. The thermally conductive particles generally have an aspect ratio less than 100:1, 75:1, or 50:1. In some embodiment, the thermally conductive particles have an aspect ratio less than 3:1, 2.5:1, 2:1, or 1.5:1. In some embodiments, generally symmetrical (e.g., spherical or semi-spherical) particles may be employed.

In some embodiments, the median particle size, d(0.50), of the thermally conductive particles is no greater than 100, 90, 80, 70, 60, 50 microns. In some embodiments, the particle size, d(0.50), of the thermally conductive particles is no greater than 40, 35, 30, 25, 20, 15 microns. In some embodiments, the particle size, d(0.50), of the thermally conductive particles is less than 10, 5 or 1 micron. In some embodiments, the particle size, d(0.50), of the thermally conductive particles is at least 10, 15, 20, or 25 nanometers. In some embodiments, the particle size, d(0.50), of the thermally conductive particles is at least 50, 75, 100, 125, 150, or 200 nanometers. In some embodiments, the particle size, d(0.50), of the thermally conductive particles is at least 500 nm, 750 nm, 1 micron, 2 microns, or 3 microns. The particle size is often reported by the manufacturer of the thermally conductive particles. The cured epoxy resin can be subjected to pyrolysis and the particle size can be determined utilizing ASTM B822-17, "Standard Test Method for Particle Size Distribution of Metal Powders and Related Compound by Light Scattering.

In typical embodiments, particle size refers to the "primary particle size", meaning the median diameter of a single (non-aggregate, non-agglomerate) particle. The primary particles can form an "agglomerate", i.e. a weak association between primary particles which may be held together by charge or polarity and can be broken down into smaller entities. These weakly bound agglomerates would typically break down during high energy mixing processes.

In some embodiments, the epoxy resin composition comprises thermally conductive particle of different sizes and/or comprises of different materials.

In some embodiments, the epoxy resin composition comprises one or more dispersants. Generally, the dispersants may act to stabilize the inorganic filler particles in the composition —without dispersant, the particles may aggregate. Suitable dispersants may depend on the specific identity and surface chemistry of thermally conductive particle. In some embodiments, suitable dispersants according to the present disclosure may include at least a binding group and a compatibilizing segment. The binding group may be ionically bonded to the particle surface. Examples of binding groups for alumina particles include phosphoric acid, phosphonic acid, sulfonic acid, carboxylic acid, and amine. The compatibilizing segment may be selected to be miscible with the curable matrix. For epoxy resin, useful compatibilizing agents may include polyalkylene oxides, e.g., polypropylene oxide, polyethylene oxide, as well as polycaprolactones, and combinations thereof. Commercially available examples include BYK W-9010 (BYK Additives and Instruments), BYK W-9012 (BYK Additives and Instruments), Disberbyk 180 (BYK Additives and Instruments), and Solplus D510 (Lubrizol Corporation).

In some embodiments, dispersant(s) may be present in the epoxy resin composition in an amount of at least 0.1, 0.2, 0.3, or 0.4 wt. % ranging up to 10 wt.-%, based on the total weight of the epoxy resin composition. In some embodiments, the amount of dispersant(s) is no greater than 9, 8, 7, 6, 5, 4, 3 or 2 wt.-%.

In some embodiments, the dispersant may be pre-mixed with the thermally conductive particles prior to incorporating into the (e.g. epoxy resin and/or epoxy-reactive) organic component. Such pre-mixing may facilitate the uncured epoxy resin compositions behaving like Newtonian fluids or enable shear-thinning effects behavior.

The epoxy composition may optionally further comprise various additives such as antioxidants/stabilizers, colorants, abrasive granules, thermal degradation stabilizers, light stabilizers, conductive particles, tackifiers, flow agents, bodying agents, flatting agents, inert non-conductive fillers, binders, blowing agents, fungicides, bactericides, surfactants, plasticizers, and other additives known to those skilled in the art. These additives, if present, are added in an amount effective for their intended purpose. The total amount of such additives is generally no greater than 10, 9, 8, 7, 6, 4, 3, 2, 1.5, 1, or 0.5 wt.-% of the total epoxy resin composition.

In some embodiments, the curable compositions may be provided (e.g., packaged) as a two-part composition, in which a first part includes the epoxy resin and a second part includes the epoxy-reactive oligomeric component(s) and other epoxy-reactive components, such as curatives. When the oligomeric components is a toughening agent, the toughening agent is typically combined with the epoxy resin.

Other components of the curable composition (e.g., thermally conductive particles, dispersant(s), catalysts, additives such as antioxidants, and the like), can be included in one or both of the first and second parts. In some embodiments, the curable composition is provided in a dispenser comprising a first chamber and a second chamber. The first chamber comprises the first (e.g. epoxy resin) part, and the second chamber comprises the second (e.g. epoxy-reactive components) part.

The inclusion of the relatively high concentration of thermally conductive particles can affect the mechanical properties. The epoxy resin(s) and oligomeric component(s) are selected to render the cured epoxy resin compositions particularly useful as an enclosure (e.g. housing or case) for an electronic device.

In some embodiments, the cured epoxy resin composition has a strain at break as measured according to ASTM D638 (as described in greater detail in the examples) of at least 1, 2, 3, 4, 5, 6, or 7%. The strain at break is typically less than the same epoxy resin composition lacking thermally conductive particles (e.g. 20%). In some embodiments, the cured epoxy resin composition has a strain at break of no greater than 15% or 10%.

In some embodiments, the cured epoxy resin composition has an elastic modulus as measured according to ASTM D638 (as described in greater detail in the examples) of at least 2, 3, 4, 5, 6, or 7 GPa. In some embodiments, the cured epoxy resin composition has an elastic modulus of no greater than 50, 45, 40, 35, 30, 25, 20, or 15 GPa.

In some embodiments, the cured epoxy resin composition is radio frequency transparent such that the cured epoxy resin has a loss tangent of <0.03 for frequencies ranging from $10^4$ to $10^{10}$ hertz.

In some embodiments, the cured epoxy resin composition has a gloss value of at least 70, 75, 80, or 85 as measured according to the test method described in the examples. The gloss value is typically no greater than 95 or 90.

The curable epoxy resin composition can be formed into an enclosure using any known molding methods that are suitable for epoxy resin compositions. In one embodiment, the curable epoxy resin compositions may be provided as a two-part composition. Generally, the two components of a two-part composition may be mixed prior to being formed into an enclosure such as by dispensing the epoxy resin composition into a mold.

In one embodiment, a transfer film comprising a release liner, a transfer polymer layer disposed on the release liner, and a plurality of microspheres embedded in the transfer polymer layer is provided in the mold prior to providing the epoxy resin composition. The method further comprises removing the release liner and transfer polymer layer after curing the epoxy resin. Further details concerning the transfer film and making a shaped finished article are described in U.S. Patent Application Ser. No. 62/552,465; incorporated herein by reference.

The microspheres comprise glass, glass ceramics, ceramics, polymers, metals, and combinations thereof. Glass is an amorphous material, while ceramic refers to a crystalline or partially crystalline material. Glass ceramics have an amorphous phase and one or more crystalline phases. These materials are known in the art.

In some embodiments, the microspheres are glass beads. The glass beads are largely spherically shaped. The glass beads are typically made by grinding ordinary soda-lime glass or borosilicate glass, typically from recycled sources such as from glazing and/or glassware. Common industrial glasses could be of varying refractive indices depending on their composition. Soda lime silicates and borosilicates are some of the common types of glasses. Borosilicate glasses typically contain boria and silica along with other elemental oxides such as alkali metal oxides, alumina etc. Some glasses used in the industry that contain boria and silica among other oxides include E glass, and glass available under the trade designation "NEXTERION GLASS D" from Schott Industries, Kansas City, Missouri, and glass available under the trade designation "PYREX" from Corning Incorporated, New York, New York.

In some embodiments, the microspheres are substantially spherical, for example, having a sphericity of at least 80%, 85%, or even 90%, where sphericity is defined as the surface area of a sphere (with the same volume as the given particle) divided by the surface area of the particle, reported as a percentage.

The microspheres may be transparent, translucent, or opaque. In one embodiment, the microspheres have a refractive index of at least 1.4, 1.6, 1.8, 2.0 or even 2.2. The refractive index may be determined by the standard Becke line method.

In some embodiments, a useful range of average microsphere diameters is at least 5, 10, 20, 25, 40, 50, 75, 100, or even 150 µm (micrometers); at most 200, 400, 500, 600, 800, 900, or even 1000 µm. The microspheres may have a unimodal or multi-modal (e.g., a bimodal) size distribution depending on the application.

The inclusion of the microspheres partially embedded in the cured epoxy resin can increase the pencil hardness. In one embodiment, the pencil hardness is at least 6K, 7H, 8H, 9H or 10H. The pencil hardness is typically no greater than 10H.

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

EXAMPLES

Unless otherwise noted, all parts, percentages, ratios, etc. in the Examples and the rest of the specification are by weight. Unless stated otherwise, all other reagents were obtained, or are available from fine chemical vendors such as Sigma-Aldrich Company, St. Louis, Missouri, or may be synthesized by known methods.

Material abbreviations used in the Examples are listed in Table 1 below.

TABLE 1

Materials

| Chemical Description | Supplier, Location | Trade Designation (Abbreviation) |
|---|---|---|
| Epoxy Resins | | |
| Diglycidyl ether of bisphenol-A | Hexion, Columbus, OH | EPON 826 (Bis-A) |
| 3,4-Epoxycyclohexylmethyl 3,4-epoxycyclohexane carboxylate | Lindau Chemicals, Inc., Columbia, SC | LINDOXY 190 (Cycloaliphatic Ester, L190) |
| Bis((3,4-epoxycyclohexyl) methyl) adipate | Synasia, Shanghai. CN | EPOXY 28 (Cycloaliphatic Adipate) |
| 3,4-Epoxycyclohexylmethyl 3,4-epoxycyclohexane carboxylate | Synasia Inc. Metuchen NJ. | Syna Epoxy 21 |
| Curative -Norbornane diamine | Mitsui Chemicals, Tokyo, Japan | (NBDA) |
| Catalyst - Antimony hexafluoride catalyst | King Industries, Norwalk, CT | K-PURE CXC-1612 (CXC-1612) |
| Thermally Conductive Particles | | |
| Aluminum Oxide (~800 nm D50) | Nippon Steel and Sumikin Materials Co., Tokyo, JP | (AX1M Alumina) |
| Aluminum Oxide (~11 μm D50) | Admatechs, Shanghai, CN | AO-509 (AO-509) |
| Aluminum Oxide (~35 μm D50) | Nippon Steel and Sumikin Materials Co., Tokyo, JP | (AY35-75 Alumina) |
| Aluminum Trihydrate 99.6% | Huber Engineered Materials, Atlanta, GA | HYDRALCOAT 7 (ATH) |
| Oligomeric Component | | |
| Linear polyester diol derived from caprolactone monomer, terminated by primary hydroxyl groups, mean molecular wt. 550 g/mole, melt point 18-23° C. | Perstorp, Malmo, Sweden | CAPA 2054 (C2054) |
| Trifunctional caprolactone polyol (300 g/mole MW) | Perstorp UK LTD, Warrington Cheshire WA | CAPA 3031 |
| Trifunctional polyol oligomer | Dow Chemical Company, Midland, MI | TONE 301 (T301) |
| Epoxy Resin Pre-reacted with Oligomeric Component | DIC Corporation, Tokyo, Japan | EPICLON EXA-4850-150 (E4850) |
| Diepoxide oligomer, liquid, molecular weight 700 g/mole | | |
| Toughening Agent Core-shell rubber in diglycidyl ether of bisphenol-A | Kaneka, Pasadena, TX | MX-150 (M150) |
| Dispersant Phosphate acid ester dispersant | BYK Additives and Instruments, Wesel, Germany | BYK-W 9012(B9012) |
| Dispersant Copolymer with acidic groups | BYK Additives and Instruments, Wesel, Germany | BYK-W 9010 (B9010) |
| Low density polyethylene available under the trade designation PETROTHENE NA219-000 from Lyondell Basell, Houston, TX. | | |
| Borosilicate beads | Prepared as described below. | (Borosilicate beads) |
| Silane coupling agent | Momentive Performance Materials, Inc., Waterford, NY | SILQUEST A1100 (SA1100) |

Test Methods
Mechanical Testing—Elastic Modulus and Strain at Break

All examples were prepared by thermally curing resins in glass molds. The glass molds were pre-treated with a mold release-agent, FREKOTE 55NC (Henkel, Dusseldorft, Germany), and dried three times prior to pouring resin. Glass plates were separated by rubber gasket material with appropriate thickness. ⅛ inch (3.18 millimeter (mm)) thickness was used for tensile and DMA specimens. Plaques were cured at that thickness with dimensions of approximately 6 inches×8 inches (15.24 centimeter (cm)×20.32 cm). From this plaque, 6 tensile specimens were cut to 4.5 inches×0.75 inches (11.43 cm×1.91 cm) and trimmed to a 0.25 inch (6.35 mm) gauge section using a router, to make specimens consistent with the ASTM D638 type IV geometry. These samples were tested in tension at a displacement rate of 5 mm/minute in a MTS Insight (Eden Prairie, MN) load frame equipped with an extensometer and load cell to get load-displacement and ultimately elastic modulus and average strain at break reported in Table 4.

Cured resin density was determined by measuring the mass of a sample in air and measuring the mass of the same sample submerged in heptane. The density was then calculated based on Archimedes' principle.

Thermal Conductivity

Cured resin discs with diameter of approximately 12.7 mm and thickness of approximately 2 mm were prepared by curing resin in 12.7 mm diameter vials. The vials had been treated with mold release agent (FREKOTE 55NC). After cure, the resin was removed from the vials and cut to 2 mm thick discs for laser flash analysis (LFA) as described below.

Direct thermal diffusivity measurements were made using the flash analysis method as per ASTM E1461 (2013) using a light flash thermophysical properties analyzer ("HYPER-FLASH LFA 467" obtained from Netzsch Instruments North America LLC, Boston, MA). Every sample set included a reference sample (obtained under the trade designation "PYROCERAM 9606" from Netzsch Instruments North America) acting as a method control for diffusivity measurements. Samples were coated with a 3-5 micrometer layer of spray on graphite (obtained under the trade designation "DGF 123 DRY GRAPHITE FILM SPRAY" from Miracle Power Products Corporation, Cleveland, OH) on the light impingement side and the detection side to normalize surface effusivity and absorptivity for all samples. In a single measurement, called a "shot," a short time duration pulse of light (Xenon flash lamp, 230 V, 15 microsecond duration) was impinged onto one side of a sample, and a thermogram (time trace of measured temperature) was recorded on the opposite side of the sample, as measured by the voltage on an InSb IR detector. Diffusivity was calculated from a fit of the thermogram to Cowan plus pulse correction model for through plane. The through-plane diffusivity was calculated using the Cowan method with an additional correction for a finite pulse width while in-plane diffusivity used the isotropic model with the aid of the software (obtained under the trade designation "PROTEUS" from Netzsch, Selb, Germany). Five shots were obtained for each sample at 25° C. The product of measured density (geometric from 2.54 cm (1 inch) discs), specific heat capacity (by differential scanning calorimetry), and diffusivity gives the thermal conductivity. That is, $$k(W/m/K) = \rho(g/cm^3) \times c_P(J/K/g) \times \alpha(mm^2/s).$$

Dynamic Mechanical Analysis (DMA)

Glass transition temperatures were determined from the tan(delta) peak of the elastic modulus as measured by DMA. A sample was prepared with dimensions of 1.7 mm×12.7 mm×30 mm, and loaded into a single cantilever fixture with span of approximately 20 mm. The sample was tested in single cantilever mode with a deflection of 20 μm at frequency of 10 Hz, and the storage modulus (E') and loss modulus (E") were measured. The tan(delta) value was calculated:

$$\tan(\text{delta}) = E''/E'.$$

Measurements were taken as the temperature was ramped from 0° C. to 175° C. at 3° C./min. The reported glass transition temperature, $T_g$, is the temperature at the tan (delta) maximum.

When the cured epoxy resin composition has at least two glass transition temperatures, the cured Tg is defined as the ultimate Tg or Tan delta transition of highest intensity which may or may not be the highest temperature transition.

Gloss Measurement 3 inches×3 inches×⅛ inch (7.62 cm×7.62 cm×3.18 mm) specimens were cut from plaques and used to measure gloss as a function of particle size. Gloss measurements (Table 5) were made using a BYK Spectro Guide gloss meter (Product #6834, BYK Additives and Instruments, Wesel, Germany) on the molded samples. The gloss meter gave measurements at an angle of 60°. A high gloss material was defined as having a value above 70 gloss units (GU).

Pencil Hardness

Parts were evaluated for pencil hardness according to ASTM D3363-5 05(2011)e2. Abrasive sandpaper (Grit No. 400) was adhered to a flat and smooth benchtop with double coated tape. Pencil leads (Turquoise Premium pencil leads (10H to 6B in hardness)) from Prismacolor Professional Art Supplies, a subsidiary of Newell Rubbermaid Office Products, Oak Brook, IL. were used. The pencil leads in a mechanical lead holder (TOTIENS 210 99 from Cretacolor, Hirm, Austria) were held at an angle of 90° to the abrasive paper and abraded until a flat, smooth, circular cross-section was achieved, free of chips or nicks on the edge of the lead. The force on the tip of the pencil was fixed at 7.5 Newtons (N) or in some cases less. Using a freshly prepared pencil lead for each test, the lead was pressed firmly against the part at a 45° angle and at the desired load using an Elcometer 3086 Motorised Pencil Hardness Tester (Elcometer Incorporated, Rochester 15 Hills, MI) and drawn across the test panel in the "forward" direction for a distance of at least ¼ inch (6.4 mm). Three pencil tracks were made for each grade of lead hardness. Prior to inspection, crumbled lead was removed from the test area using a damp paper towel wetted with isopropyl alcohol. The test panel was inspected by eye for defects and under an optical microscope (50×-1000× magnification) for the first ⅛ to ¼ inch (3.2 to 6.4 mm) of each pencil track. Moving from harder leads to softer, the process was repeated down the hardness scale until a pencil was found that did not scratch the film or rupture it, or dislodge or partially dislodge any microspheres. At least two of three tracks at each lead hardness were required to meet these criteria to pass. The hardest level of lead that passed was reported as the pencil hardness of the test panel. Values of 3H at a force of 5 Newtons, or harder, are desirable.

Dielectric Constant and Loss Tangent Measurement for RF Transparency

The terms "dielectric constant", "dielectric loss", "loss tangent" are used consistent their commonly understood definitions. Dielectric constant (at any frequency) is the amount of energy stored per cycle of electric field oscillation and is determined as the real part of the complex electrical permittivity defined for Maxwell's equations. Dielectric loss (at any frequency) is the amount of energy dissipated per cycle of electric field oscillation and is determined as the imaginary part of the complex electrical permittivity defined for Maxwell's equations. Loss tangent (at any frequency) is the ratio of the dielectric loss to the dielectric constant.

The dielectric properties measurements up to 1 MHz were performed with an Alpha-A High Temperature Broadband Dielectric Spectrometer modular measurement system from Novocontrol Technologies Gmbh (Montabaur, Germany). All testing was performed in accordance with the ASTM D150 test standard. Some of the films were painted with copper paint, and some were laminated directly on the brass electrode without any copper paint depending on how well the samples were able to conform to the electrode surface. The Novocontrol ZGS Alpha Active Sample Cell was implemented once each sample was placed between two optically polished brass disks (diameter 40.0 mm and thickness 2.00 mm).

The dielectric properties measurements above 1 MHz were performed with three separate Split Post Dielectric Resonators at 2.5 GHz, 5.6 GHz and 9.5 GHz respectively. All measurements above 1 MHz were performed according to the standard IEC 61189-2-721.

Refractive Index Measurement (Becke Line Method)

A set of certified refractive index test liquids available from Cargille of Cedar Grove, New Jersey were used to determine the refractive index of the transparent microspheres using the procedure described below.

A sample of the transparent microspheres were placed on a microscope slide and a drop of test liquid is contacted with the sample and covered with a cover slip. The microscope was adjusted to focus on the beads. At focus, the stage of the microscope is lowered using the focus and the bright line at the outline of the microsphere is observed as the focus was changed. If the bright line travels outward into the liquid as the stage is lowered, then the liquid had a higher index of refraction than the bead. If, on the other hand, the bright line travels into the bead, then the microsphere had the higher index of refraction. By testing a series of liquids of different index the approximate index of the microsphere was identified. If two liquids lie on either side of the index of refraction of the microsphere then an interpolation of the true number was made.

Examples and Comparative Examples

Materials in Table 1 were used as received unless otherwise noted. The weight percentages of components are described in Tables 2 (inorganic content and dispersant) and Table 3 (curable organic resin). The volume % (vol. %) of thermally conductive particles was calculated based on the mass of the input materials and assuming alumina particle density of 3.9 gram per cubic centimeter (g/cc), aluminum trihydrate (ATH) particle density of 2.2 g/cc, and resin density of 1.15 g/cc.

TABLE 2

Inorganic and dispersant concentration

| Example No. | Inorganic Particle Type and Size (D50) | Wt. % Particle | Vol. % Particle | Dispersant wt. % |
|---|---|---|---|---|
| CE 1 | None | 0 | 0 | 0 |
| CE 2 | None | 0 | 0 | 0 |
| CE 3 | AX1M Alumina (800 nm) | 73 | 45 vol % | 1.5 |
| Ex 1 | AX1M Alumina (800 nm) | 79.6 | 54 vol % | 1.6 |
| Ex 2 | AX1M Alumina (800 nm) | 78 | 53 vol % | 0.4 |
| Ex 3 | AX1M Alumina (800 nm) | 80 | 55 vol % | 0.4 |
| Ex 4 | AX1M Alumina (800 nm) | 80 | 55 vol % | 0.4 |
| Ex 5 | AY35-75 Alumina (35 μm) | 80 | 55 vol % | 0.4 |
| Ex 6 | AX1M Alumina (800 nm) | 80 | 55 vol % | 0.4 |
| Ex 7 | AY35-75 Alumina (35 μm) | 80 | 55 vol % | 0.4 |
| Ex 8 | AX1M (800 nm) & ATH (700 nm) | 80 | 58 vol % | 0.4 |
| Ex 9 | A0-509 Alumina (11 μm) | 80 | 55 vol % | 0.4 |

TABLE 3

Resin content for examples

| Sample ID | Epoxy Type | Epoxy wt. % | Curative Wt. % | Oligomeric Component | Oligomeric Component Wt. % |
|---|---|---|---|---|---|
| CE 1 | Cyclo-aliphatic Ester | 59.7 | CXC-1612 0.5 | C2054 | 39.8 |
| CE 2 | Bis-A | 78 | NBDA 22 | None | 0 |
| CE 3 | Bis-A | 17.7 | NBDA 4.8 | M150 Core Shell Rubber Toughener | 3 |
| Ex 1 | Cyclo-aliphatic Ester | 18.3 | CXC-1612 0.5 | None | 0 |
| Ex 2 | Bis-A | 10.2 | NBDA 2.8 | E4850 | 8.6 |
| Ex 3 | Cyclo-aliphatic Ester | 11.8 | CXC-1612 0.5 | C2054 | 7.3 |
| Ex 4 | Cyclo-aliphatic Ester | 11.0 | CXC-1612 0.5 | C2054 | 8.0 |

TABLE 3-continued

Resin content for examples

| Sample ID | Epoxy Type | Epoxy wt. % | Curative Wt. % | Oligomeric Component | Oligomeric Component Wt. % |
|---|---|---|---|---|---|
| Ex 5 | Cyclo-aliphatic Ester | 11.8 | CXC-1612 0.5 | C2054 | 7.3 |
| Ex 6 | Cyclo-aliphatic Ester | 11.4 | CXC-1612 0.5 | T301 | 7.6 |
| Ex 7 | Cyclo-aliphatic Ester | 16.4 | CXC-1612 0.5 | C2054 | 2.7 |
| Ex 8 | Cyclo-aliphatic Ester | 11.4 | CXC-1612 0.5 | C2054 | 7.6 |
| Ex 9 | Cyclo-aliphatic Ester | 11.8 | CXC-1612 0.5 | C2054 | 7.3 |

Comparative Examples (CE) 1 and 2 are representative unfilled epoxy resins. Without incorporation of the oligomeric diol, CE 1 was extremely brittle and unable to be machined into tensile samples. In representative Comparative Example 1, 90 grams (g) of cycloaliphatic ester (L190), 60 g C2054 and 3.75 g CXC-1612 were combined in a 300 g capacity speed-mix cup (FlackTek Inc., Landrum, SC). The components were speed-mixed at 2200 revolutions per minute (rpm) for 30 seconds in a DAC600 VAC mixer (FlackTek Inc.) under atmospheric conditions, followed by vacuum degassing while speed mixing at 800 rpm for 3 minutes. The final pressure reached under vacuum was approximately 10 millibar (mbar). CE 2 was mixed and degassed in the same way using resin amounts consistent with Table 3.

The cure cycle for CE 1, Ex 1, and any examples cured with CXC-1612 was 30 minutes at 80° C. followed by 60 minutes at 120° C. The cure cycle for CE 2 and any material cured with NBDA was 1 hour at 80° C. After cure, resin plaques were cooled to room temperature and de-molded before cutting to appropriate geometry as described in the Mechanical Testing—Elastic Modulus and Strain at Break section.

Ex 3-Ex 9 were all processed in a similar fashion, with weight proportions of components consistent with Tables 2 and 3. In representative Example 3, 240 g AX1M alumina particles were combined with 1.2 g B9012 in a FlackTek speed mix cup and speed mixed for 30 seconds at 1500 rpm in a DAC600.2 VAC mixer (FlackTek Inc.). Then 1.5 g CXC-1612, 33.2 g L190, and 24.1 g C2054 were added to the speed mix cup, followed by speed-mixing at a 2200 rpm for 30 seconds under atmospheric conditions, and vacuum degassing while speed mixing at 800 rpm for 3 minutes. The pressure reached under vacuum was approximately 10 mbar. After mixing, the resin was flowable but not fully de-agglomerated, so it was run through a 3-roll mill with ceramic rollers (Exakt Technologies Inc., Model 50 I) to de-agglomerate. A final mixing and degassing step was applied at 800 rpm at a vacuum pressure ramped down to 10 pounds per square inch (psi), or 0.069 megapascals (MPa). The mixed and degassed resin was poured into mold release-treated glass molds and cured for 30 minutes at 80° C., followed by 1 hour at 120° C. After cure, resin plaques were cooled to room temperature and de-molded before cutting to appropriate geometry as described below. The same procedure and cure cycle were used for Ex 3-Ex 9.

CE 3 and Ex 2 consists of the epoxy resin described by CE 2, filled with thermally conductive filler. Alumina particles were mixed separately into the epoxy and curative (NBDA) components. Both epoxy and curative contained alumina particles at weight percent equal to the total weight percent in Table 3. In representative Ex 2, 209 g of AX1M alumina particles were speed mixed with 1.04 g B9012 at 1500 rpm for 30 seconds in a 300 g capacity speed-mix cup. To this cup, 28 g of bis-A epoxy and 24 g of a chain extending epoxy, E4850, were added and the mixture was speed mixed and run through a 3-roll mill as above. In a separate 200 g capacity speed mix cup, 31 g of AX1M alumina particles were combined with 0.15 g B9012 and speed mixed for 30 seconds at 2200 rpm. Then 7.9 grams of NBDA (curative) were added and speed mixed at for 30 seconds at 2200 rpm. The alumina-filled epoxy and alumina-filled curative were combined into a single 300 g speed mix cup and vacuum degassed at 800 rpm for 3 minutes until a vacuum pressure of 10 mbar was reached. The mixed resin was poured into glass molds treated with mold release agent and cured for 1 hour at 80° C. CE 3 was prepared via the same procedure as Ex 3 to Ex 9, using the amounts described in Tables 2 and 3. Ex 10, was the epoxy resin composition from Ex 4 with a borosilicate glass beaded surface for improved hardness and scratch resistance.

Borosilicate glass powder was passed through a flame treater twice by passing it through a hydrogen/oxygen flame at a rate of 3 grams/minute to form microspheres that were collected in a stainless steel container whereupon metallic impurities were removed using a magnet. The resulting glass microspheres were treated with 600 ppm of A1100 in the following manner. The silane was dissolved in water, then added to the microspheres with mixing, air dried overnight, followed by drying at 110° C. for 20 minutes. The dried, silane treated microspheres were then sieved to remove any agglomerates and provide microspheres having a size of 75 micrometers or less and were free flowing. The resulting transparent silane treated microspheres were cascade coated using a mechanical sifter onto a transfer carrier film comprising a 25 micrometer (0.0010 inch) low density polyethylene coating on a 97 micrometer (0.0038 inch) polyester release liner which had been preheated to about 140° C. (284° F.), to form a bead carrier having a uniform layer of transparent microspheres embedded in the low density polyethylene layer to a depth corresponding to about 30-40% of their diameter as determined by a magnifying imaging system.

A 200 mm×200 mm (7.9 inch×7.9 inch) section of transfer film with embedded borosilicate beads was adhered to one inner face of a glass mold (having a 200 mm×250 mm×3 mm cavity) with the beaded side facing in, such that when the mold was filled with the epoxy resin composition, the borosilicate beads contact and are partially embedded in the epoxy resin composition. The mold was filled with resin described by Ex 4. The epoxy, beaded surface, and mold were heated in an oven at 90° C. for 1 hour in order to gel the epoxy. The mold was disassembled and the polyester release liner together with the low density polyethylene was removed from the silicate beads, leaving a beaded borosilicate surface on the epoxy resin. This was cured for 1 hour at 120° C. Ex 10 was tested mechanically in tension and for pencil hardness as described above with results included in Table 4 and Table 6, respectively.

TABLE 4

Thermal and Mechanical Properties for Examples

| Ex. No. | Wt. % Oligomeric Component | Vol. % Thermally Conductive Particle | Thermal Conductivity W/m*K | Cured Resin Density g/cc | Elastic Modulus GPa | Strain at Break % | Tg* |
|---|---|---|---|---|---|---|---|
| CE 1 | 39.8 | 0 | 0.20 | 1.26 | 1.7 | 19.5 | 153 |
| CE 2 | 0 | 0 | 0.22 | 1.16 | 2.7 | 7.5 | NM |
| CE 3 | 3 | 45 vol. % | 0.85 | 2.29 | 10.5 | 0.5 | NM |
| Ex 1 | 0 | 54 vol. % | 1.06 | 2.47 | 13.4 | 0.4 | 129 |
| Ex 2 | 8.6 | 53 vol. % | NM | NM | 10.1 | 0.2 | 71 |
| Ex 3 | 7.3 | 55 vol. % | 1.26 | 2.50 | 8.7 | 2.8 | 74 |
| Ex 4 | 8.0 | 55 vol. % | 1.20 | 2.54 | 7.2 | 4.0 | 61 |
| Ex 5 | 7.3 | 55 vol. % | 1.96 | 2.49 | 8.14 | 1.6 | 74 |
| Ex 6 | 7.6 | 55 vol. % | 1.31 | 2.56 | 11.4 | 1.3 | 68 |
| Ex 7 | 2.7 | 55 vol. % | NM | NM | 7.5 | 1.2 | 73 |
| Ex 8 | 7.6 | 58 vol. % | 1.37 | 2.43 | 10.4 | 3.1 | NM |
| Ex 9 | 7.3 | 55 vol. % | 1.43 | 2.52 | 10.6 | 2.3 | NM |
| Ex 10 | 8.0 | 55 vol. % | NM | NM | 7.4 | 5.4 | NM |

NM—Not Measured
*Tg by tan(delta) Peak, ° Celsius

TABLE 5

Gloss Properties

| Example No. | Gloss Reading of Molded Sample (Gloss Units) |
|---|---|
| Ex 3 | 85.7 |
| Ex 5 | 45.9 |
| Ex 9 | 88.3 |

TABLE 6

Pencil hardness

| Example No. | Pencil Hardness |
|---|---|
| CE 2 | <6B |
| Ex 3 | 3B |
| Ex 5 | B |
| Ex 10 | 10H |

TABLE 7

Radio frequency dielectric properties
(dielectric constant and Tan δ)

| | 1 kHz | | 100 kHz | | 1 MHz | |
|---|---|---|---|---|---|---|
| | Dielectric Constant | Tan δ | Dielectric Constant | Tan δ | Dielectric Constant | Tan δ |
| Ex 3 | 6.80 | 0.0111 | 6.59 | 0.0081 | 6.47 | 0.0121 |
| Ex 5 | 6.44 | 0.0086 | 6.08 | 0.0217 | 5.84 | 0.0236 |

Ex. 11

150.3 grs AX1M alumina particles were combined with 48.77 grs of Syna Epoxy 21, 19.11 grams of C2054 and 4.81 grs of C3031 in a FlackTek speed mix cup and speed mixed for 30 seconds at 2000 rpm in a DAC 600.2 VAC mixer (FlackTek Inc.). Then 0.76 grs of BYK 9010 were added and formulation speed mixed at 2000 rpms for 30 seconds. The remaining 150.33 grs of AX1M alumina particles were then added along with 1.84 grs of CXC 1612 and speed mixed 2000 rpms for 30 seconds. After mixing, the resin was flowable but not fully de-agglomerated, so it was run through a 3-roll mill with ceramic rollers (Exakt Technologies Inc., Model 50 I) to de-agglomerate. A final mixing and degassing step using the DAC 600.2 was applied which took the vacuum pressure down to 10 pounds per square inch (psi) over 200 seconds. The mixed and degassed resin was poured into release-treated molds and cured. After cure, resin plaques were cooled to room temperature and de-molded before cutting to appropriate geometry as described below.

Ex. 12

50.3 grs AX1M alumina particles were combined with 16.735 grs of Syna Epoxy 21, 7.178 grams of C2054 in a FlackTek speed mix cup and speed mixed for 30 seconds at 2000 rpm in a DAC 600.2 VAC mixer (FlackTek Inc.). Then 0.498 grs of BYK 9010 were added and formulation speed mixed at 2000 rpms for 30 seconds. The remaining 50.2 grs of AX1M alumina particles were then added along with 0.6009 grs of CXC 1612 and speed mixed 2000 rpms for 30 seconds. After mixing, the resin was flowable but not fully de-agglomerated, so it was run through a 3-roll mill with ceramic rollers (Exakt Technologies Inc., Model 50 I) to de-agglomerate. A final mixing and degassing step using the DAC 600.2 was applied which took the vacuum pressure down to 10 pounds per square inch (psi) over 200 seconds. The mixed and degassed resin was poured into release-treated molds and cured. After cure, resin plaques were cooled to room temperature and de-molded before cutting to appropriate geometry as described below.

Ex. 13

50.2 grs AX1M alumina particles were combined with 17.925 grs of Syna Epoxy 21, 5.958 grams of C2054 in a FlackTek speed mix cup and speed mixed for 30 seconds at 2000 rpm in a DAC 600.2 VAC mixer (FlackTek Inc.). Then 0.4968 grs of BYK 9010 were added and formulation speed mixed at 2000 rpms for 30 seconds. The remaining 49.95 grs of AX1M alumina particles were then added along with 0.5974 grs of CXC 1612 and speed mixed 2000 rpms for 30 seconds. After mixing, the resin was flowable but not fully de-agglomerated, so it was run through a 3-roll mill with ceramic rollers (Exakt Technologies Inc., Model 50 I) to de-agglomerate. A final mixing and degassing step using the DAC 600.2 was applied which took the vacuum pressure down to 10 pounds per square inch (psi) over 200 seconds. The mixed and degassed resin was poured into release-treated molds and cured. After cure, resin plaques were cooled to room temperature and de-molded before cutting to appropriate geometry as described below.

Ex. 14

49.98 grs AX1M alumina particles were combined with 18.082 grs of Syna Epoxy 21, 6.041 grams of C 2054 in a FlackTek speed mix cup and speed mixed for 30 seconds at 2000 rpm in a DAC 600.2 VAC mixer (FlackTek Inc.). Then 0.2516 grs of BYK 9012 were added and formulation speed mixed at 2000 rpms for 30 seconds. The remaining 50.2 grs of AX1M alumina particles were then added along with 0.6033 grs of CXC 1612 and speed mixed 2000 rpms for 30 seconds. After mixing, the resin was flowable but not fully de-agglomerated, so it was run through a 3-roll mill with ceramic rollers (Exakt Technologies Inc., Model 50 I) to de-agglomerate. A final mixing and degassing step using the DAC 600.2 was applied which took the vacuum pressure down to 10 pounds per square inch (psi) over 200 seconds. The mixed and degassed resin was poured into release-treated molds and cured. After cure, resin plaques were cooled to room temperature and de-molded before cutting to appropriate geometry as described below.

Ex. 15

62.26 grs AX1M alumina particles were combined with 18.5228 grs of Syna Epoxy-21, 11.365 grams of C2054 in a FlackTek speed mix cup and speed mixed for 30 seconds at 2000 rpm in a DAC 600.2 VAC mixer (FlackTek Inc.). Then 0.6224 grs of BYK 9012 were added and formulation speed mixed at 2000 rpms for 30 seconds. The remaining 62.25 grs of AX1M alumina particles were then added along with 0.7473 grs of CXC 1612 and speed mixed 2000 rpms for 30 seconds. After mixing, the resin was flowable but not fully de-agglomerated, so it was run through a 3-roll mill with ceramic rollers (Exakt Technologies Inc., Model 50 I) to de-agglomerate. A final mixing and degassing step using the DAC 600.2 was applied which took the vacuum pressure down to 10 pounds per square inch (psi) over 200 seconds. The mixed and degassed resin was poured into release-treated molds and cured. After cure, resin plaques were cooled to room temperature and de-molded before cutting to appropriate geometry as described below.

Ex. 16

50.05 grs AX1M alumina particles were combined with 16.039 grs of Syna Epoxy-21, 7.89 grams of C2054 in a FlackTek speed mix cup and speed mixed for 30 seconds at 2000 rpm in a DAC 600.2 VAC mixer (FlackTek Inc.). Then 0.4991 grs of BYK 9012 were added and formulation speed mixed at 2000 rpms for 30 seconds. The remaining 50.15 grs of AX1M alumina particles were then added along with 0.5952 grs of CXC 1612 and speed mixed 2000 rpms for 30 seconds. After mixing, the resin was flowable but not fully de-agglomerated, so it was run through a 3-roll mill with ceramic rollers (Exakt Technologies Inc., Model 50 I) to de-agglomerate. A final mixing and degassing step using the DAC 600.2 was applied which took the vacuum pressure down to 10 pounds per square inch (psi) over 200 seconds. The mixed and degassed resin was poured into release-treated molds and cured. After cure, resin plaques were cooled to room temperature and de-molded before cutting to appropriate geometry as described below.

| Ex. No. | Tan delta peak width at half height (° C.) | Single Tg (Y/N) | Multiple Tg (Y/N) | Tg (° C.) |
| --- | --- | --- | --- | --- |
| Ex 11 | 43 | Y | N | 94 |
| Ex 12 | 47 | Y | N | 89 |
| Ex 13 | 47 | Y | N | 99 |
| Ex 14 | 90 | N | Y | 77 |
| Ex 15 | 106 | N | Y | 52 |
| Ex 16 | 84 | N | Y | 72 |

What is claimed is:

1. An electronic device selected from a phone, tablet, laptop, or mouse comprising an enclosure that is a housing or case, wherein the housing or case comprises a cured epoxy resin composition comprising at least 50 volume % of electrically non-conductive thermally conductive inorganic particles; wherein the cured epoxy resin composition comprises a plurality of microspheres partially embedded in the cured epoxy resin composition.

2. The electronic device of claim 1 wherein the electronic device comprises a battery that can be charged through the cured epoxy resin composition of the housing or case.

3. The electronic device of claim 1 wherein the cured epoxy resin composition comprising the plurality of microspheres partially embedded in the cured epoxy resin composition has a pencil hardness of greater than 6H.

4. The electronic device of claim 1 wherein the cured epoxy resin composition has a thermal conductivity of at least 1 W/m*K.

5. The electronic device of claim 1 wherein the electrically non-conductive thermally conductive particles comprise a material having an electronic band gap >0 eV.

6. The electronic device of claim 1 wherein the cured epoxy resin composition is radio frequency transparent such that the cured epoxy resin composition has a dielectric loss tangent <0.03 ranging from $10^4$ to $10^{10}$ Hz.

7. The electronic device of claim 1 wherein the electrically non-conductive thermally conductive particles comprise a material having a bulk thermal conductivity >10 W/m*K.

8. The electronic device of claim 1 wherein the electrically non-conductive thermally conductive particles are selected from alumina, boron nitride, silicon carbide, alumina trihydrate, and mixtures thereof.

9. The electronic device of claim 1 wherein the electrically non-conductive thermally conductive particles have a median particle size of less than 20 microns.

10. The electronic device of claim 1 wherein the cured epoxy resin comprises cyclic moieties.

11. The electronic device of claim 1 wherein the cured epoxy resin composition further comprises 2 to 20 wt.-% of oligomeric or polymeric moieties having a glass transition temperature less than 0° C.

12. The electronic device of claim 1 wherein the cured epoxy resin composition has a tensile strain at break ranging from 1 to 10%, an elastic modulus ranging from 5 to 50 GPa, or a combination thereof.

13. The electronic device of claim 11 wherein the oligomeric or polymeric moieties comprises a reacted epoxy-reactive oligomer, the epoxy reactive oligomer having a weight average molecular weight ranging from 100-3000 g/mole.

14. The electronic device of claim 1 wherein the cured epoxy resin composition has a glass transition temperature of less than 150° C.

15. The electronic device of claim 1 wherein the cured epoxy resin composition has a single glass transition temperature or at least two glass transition temperatures.

16. The electronic device of claim 1 wherein the cured epoxy resin composition has a tan delta peak width at half height of less than 50° C.

17. The electronic device of claim 1 wherein the cured epoxy resin composition has a tan delta peak width at half height of 50° C. or greater.

18. An electronic device selected from a phone, tablet, laptop, or mouse comprising an enclosure that is a housing or case, wherein the housing or case comprises a cured epoxy resin composition comprising at least 50 volume % of electrically non-conductive thermally conductive inorganic particles; wherein the cured epoxy resin composition has a tan delta peak width at half height of 50° C. or greater.

19. The electronic device of claim 18 wherein the electronic device comprises a battery that can be charged through the cured epoxy resin composition of the housing or case.

20. The electronic device of claim 18, wherein the cured epoxy resin composition comprises a plurality of microspheres partially embedded in the cured epoxy resin composition.

21. The electronic device of claim 20 wherein the cured epoxy resin composition comprising the plurality of microspheres partially embedded in the cured epoxy resin composition has a pencil hardness of greater than 6H.

22. The electronic device of claim 18 wherein the cured epoxy resin composition has a thermal conductivity of at least 1 W/m*K.

23. The electronic device of claim 18 wherein the electrically non-conductive thermally conductive particles comprise a material having an electronic band gap >0 eV.

24. The electronic device of claim 18 wherein the cured epoxy resin composition is radio frequency transparent such that the cured epoxy resin composition has a dielectric loss tangent <0.03 ranging from $10^4$ to $10^{10}$ Hz.

25. The electronic device of claim 18 wherein the electrically non-conductive thermally conductive particles comprise a material having a bulk thermal conductivity >10 W/m*K.

26. The electronic device of claim 18 wherein the electrically non-conductive thermally conductive particles are selected from alumina, boron nitride, silicon carbide, alumina trihydrate, and mixtures thereof.

27. The electronic device of claim 18 wherein the electrically non-conductive thermally conductive particles have a median particle size of less than 20 microns.

28. The electronic device of claim 18 wherein the cured epoxy resin comprises cyclic moieties.

29. The electronic device of claim 18 wherein the cured epoxy resin composition further comprises 2 to 20 wt.-% of oligomeric or polymeric moieties having a glass transition temperature less than 0° C.

30. The electronic device of claim 18 wherein the cured epoxy resin composition has a tensile strain at break ranging from 1 to 10%, an elastic modulus ranging from 5 to 50 GPa, or a combination thereof.

31. The electronic device of claim 18 wherein the oligomeric or polymeric moieties comprises a reacted epoxy-reactive oligomer, the epoxy reactive oligomer having a weight average molecular weight ranging from 100-3000 g/mole.

32. The electronic device of claim 18 wherein the cured epoxy resin composition has a glass transition temperature of less than 150° C.

33. The electronic device of claim 18 wherein the cured epoxy resin composition has a single glass transition temperature or at least two glass transition temperatures.

* * * * *